United States Patent [19]

Backer

[11] Patent Number: 4,712,336

[45] Date of Patent: Dec. 15, 1987

[54] INTERCONNECTING "FULL BLEED" MODULAR PANEL AND CONNECTIVE HARDWARE SYSTEM TO FORM A VARIETY OF EXHIBIT AND OFFICE INTERIOR ENCLOSURES

[76] Inventor: Bruce E. Backer, 4430 Del Monte Ave., San Diego, Calif. 92107

[21] Appl. No.: 900,161

[22] Filed: Aug. 25, 1986

Related U.S. Application Data

[63] Continuation-in-part of Ser. No. 485,864, Apr. 18, 1983, abandoned.

[51] Int. Cl.⁴ ............................................. E04B 1/344
[52] U.S. Cl. ........................................ 52/71; 52/242; 52/285; 52/586; 160/351; 446/122
[58] Field of Search ................ 52/71, 238.1, 239–243, 52/243.1, 275, 281, 282, 284–286, 582, 585, 586, 605, 607, 236.2; 446/111, 112, 122; 160/351

[56] References Cited

U.S. PATENT DOCUMENTS

| | | | |
|---|---|---|---|
| 210,686 | 12/1878 | Griffin | 16/384 |
| 882,482 | 3/1908 | Wilson | 52/432 |
| 1,000,395 | 8/1911 | Frost | 446/122 |
| 1,196,580 | 8/1916 | Pelot | 16/382 |
| 2,053,438 | 9/1936 | Lunken et al. | 52/584 |
| 2,849,832 | 9/1958 | Jorgensen | 446/122 |
| 3,212,561 | 10/1965 | Eckel | 16/387 |
| 3,312,033 | 4/1967 | Williams | 52/807 |
| 3,315,427 | 4/1967 | Frye | 52/605 |
| 3,626,652 | 12/1971 | Hanley | 52/584 |
| 3,802,146 | 4/1974 | Tacke et al. | 52/807 |
| 3,884,002 | 5/1975 | Logie | 52/584 X |
| 3,889,736 | 6/1975 | Firks | 160/135 |
| 3,974,610 | 8/1976 | Logie | 52/285 |
| 4,103,465 | 8/1978 | McDonald, Jr. | 52/127.12 |
| 4,118,903 | 10/1978 | Coulthard | 52/36 |
| 4,185,430 | 1/1980 | Gartung | 52/285 |
| 4,186,533 | 2/1980 | Jensen | 52/584 |
| 4,258,856 | 3/1981 | Marling | 220/22.3 |
| 4,535,577 | 8/1985 | Tenser et al. | 52/221 |
| 4,571,906 | 2/1986 | Ashton | 52/239 |
| 4,593,508 | 6/1986 | Curatolo | 52/239 |

FOREIGN PATENT DOCUMENTS

| | | | |
|---|---|---|---|
| 622777 | 10/1962 | Belgium | 16/389 |
| 644375 | 4/1937 | Fed. Rep. of Germany | 446/111 |
| 1118953 | 12/1961 | Fed. Rep. of Germany | 52/584 |
| 2733283 | 2/1979 | Fed. Rep. of Germany | 52/285 |
| 3203804 | 8/1983 | Fed. Rep. of Germany | 52/238.1 |
| 1374930 | 8/1964 | France | 16/365 |
| 2376677 | 8/1978 | France | 446/111 |
| 2501332 | 9/1982 | France | 160/351 |
| 6402421 | 3/1965 | Netherlands | 52/285 |
| 183357 | 4/1963 | Sweden | 16/382 |
| 1188624 | 4/1970 | United Kingdom | 52/586 |
| 1378300 | 12/1974 | United Kingdom | 403/295 |
| 1600990 | 10/1981 | United Kingdom | 52/238.1 |

Primary Examiner—John E. Murtagh
Assistant Examiner—Andrew Joseph Rudy
Attorney, Agent, or Firm—James W. McClain; Stanley A. Becker

[57] ABSTRACT

A modular "full bleed" panel system with interchangeable interconnecting elements for creating display booths, room dividers and the like. The system comprises a series of modular panels of different shape, construction and function, together with a series of modular connector elements adapted to interconnect with each of said panels to form any of a variety of highly stable structures which present a visually unitary appearance and in which the connector elements are not significantly visible.

44 Claims, 30 Drawing Figures

INTERCONNECTING "FULL BLEED" MODULAR PANEL AND CONNECTIVE HARDWARE SYSTEM TO FORM A VARIETY OF EXHIBIT AND OFFICE INTERIOR ENCLOSURES

RELATED APPLICATION

This application is a continuation-in-part of application Ser. No. 06/485,864 filed Apr. 18, 1983, now abandoned.

FIELD OF THE INVENTION

This invention relates generally to portable wall structures and more particularly to a lightweight modular portable system for construction of display booths and office interiors.

BACKGROUND OF THE INVENTION

In recent years the related fields of trade show exhibit booths and office interiors have turned to modular construction for the wall and enclosure structures common to both. In these modular systems, interconnecting panels are assembled into a variety of different shapes of enclosures with associated desks, shelves, display panels, lighting and the like. The principal characteristic of these systems is their ability to form many different sizes and shapes of enclosures depending on the particular types of panels chosen, plus their ability to be disassembled and reassembled into entirely different sizes and shapes of enclosures rapidly and easily.

In the past there have been modular containers, such as boxes, which were intended to be used to ship goods, then be knocked down by the customer for convenient return to the shipper for re-use. These recent modular systems differ substantially from such containers. One critical difference between the older containers and the new modular systems is that the containers are assembled into only one specific configuration. While such "collapsable boxes" can be disassembled, they can not be reassembled into any other kind of structure. Typical of these collapsible boxes is the structure shown in U.S. Pat. No. 3,626,652 to Hanley. Further, such structures commonly required relatively elaborate internal connecting means to permit their assembly and disassembly. Such means are usually unique to the particular container in question and can not be utilized to form any other type of structure.

The modular exhibit and office systems, however, are much more versatile. A wide variety of panel types can be assembled into any number of enclosure configurations. Each modular system has interconnecting means which allows the various types of panels to be interconnected in a myriad of ways.

However, the two prior types of such modular systems have had significant disadvantages. In the first type of system the various panels must be connected by means of separate, visible connecting members (commonly in the form of posts) which in effect create a framework into which the panels are placed. These connecting members are variously called by such names as "corner posts," "connector posts" and the like. In this type of system the individual panels do not themselves interconnect; rather each panel must be connected to one of the connecting members and then the next adjacent panel likewise connected to the connecting member. Such systems are of course quiet complex and require the user to buy an unduly large number of individual components to construct a typical enclosure. In addition, enclosure configurations cannot readily be changed since different configurations will usually require a different assortment of connecting means.

The second type of modular system, which developed as an improvement over the first type, uses panels which have external frames already attached. These framed panels can be interconnected by means of bolts, hooks, pins and sockets and the like without the need for the separate posts and similar connecting means. From a visual and esthetic point of view, however, such modular systems present real difficulties to the office or exhibit designer since the framework gives the appearance of "checkerboard" walls. The finished enclosure thus gives the clear visual impression of being assembled from a variety of discrete parts, rather than presenting a visual impression of a unified whole. The external framework also restricts the positions at which objects can be attached to the panels, thus limiting the freedom of the designer to create distinctive exhibits and work space interiors.

More recently the concept of "full bleed" panels has been developed. (The term "full bleed" derives from the printing industry, where a "full bleed" colored sheet has its color extending to the edges of the sheet, with no uncolored margins.) Such panels have no external framework and the decorative surfaces of the panels extend over the entire visual surface. Adjacent panels thus provide a virtually continuous visual appearance, with only a thin indistinct line to show where adjacent panels meet. Until the present invention, however, no full bleed panel systems existed which could be so easily assembled and disassembled. In many instances, such as where exhibit booths are to be used in trade shows, it is important to have a modular system which can be readily assembled by relatively unskilled labor with a minimum of tools and which then can be easily and rapidly disassembled for reuse at other shows. Similarly, it is frequently desired to change the configuration of office interiors to provide for work space for additional employees or to reorganize the work flow within an office. The ability of a modular office interior system to be easily and rapidly disassembled and reassembled is extremely important, for a company suffers considerable economic loss during the period in which the employee work spaces are being reconfigured.

In addition, the few prior art systems capable of rapid assembly without the use of tools that do exist have not been particularly stable when assembled. Units are easily shaken or rocked by slight contact. These systems are severly limited in height, since the "full bleed" panels and connector elements are not capable of rigidly stacking one atop the other; this is especially a problem when room-high structures or taller towers are needed. The problems are exacerbated when cantilevered components, such as shelves, are hung on the panels. This of course means that such systems are of limited use for exhibit booths and office interiors.

It would therefore be very desirable to have a modular full bleed panel system which would permit the rapid assembly and disassembly of the modular components into a wide variety of highly stable different configurations without the use of tools.

SUMMARY OF THE INVENTION

The modular system described herein is a full bleed system incorporating novel interconnection means such that upon assembly the finished exhibit booth, office interior or other type of enclosure is structurally stable and presents no significant visual indication of the manner in which the panels are secured. In its broadest form the invention is a modular full bleed panel and connective hardware system from which a variety of structures with shapes characteristic of wall segments, booths and the like may be assembled, said system comprising:

a. a plurality of panels of modular dimensions, each panel comprising:
    i. a substantially rigid frame fully covered on its visible surfaces;
    ii. channel means recessed in at least two opposite edges of the frame for use in interconnecting the panels, each channel means being formed with openings at either end thereof and positioned to enable longitudinal alignment of corresponding channel means of two panels aligned end-to-end and substantially parallel alignment of corresponding channel means of two panels aligned side-by-side; and
    iii. stop means as part of each channel means, the stop means being spaced a predetermined distance from the openings at either end of the channel means; and
  b. a plurality of modular connector means, each of which is adapted for insertion into adjacent ends of the channel means of at least two adjacent panels aligned end-to-end or side-by-side with the connector means after insertion presenting no significant visual appearance; each connector means comprising at least one elongated, substantially rigid post, each end of the post being adapted respectively to extend into the open end of one of the adjacent channel means of the adjacent panel members to interconnect two adjacent panels adjacent the corners thereof, the distance each connector means can extend into the end of the channel means being defined by the stop means; and the stop means when cooperatively engaged by the connector means providing positive, substantially rigid alignment of two adjacent panels by connection only through the ends of the channels adjacent the corners of the panels.

The stop means may be recessed within the channel means (in the most preferred version) but may also be located at the end of the channel means (where the predetermined distance from the end is zero).

In its various other embodiments the present system with its novel interconnection means can contain components which are hinged relative to each other.

A wide variety of different types of individual connectors are included within the scope of the present invention. Many of the different forms can be combined into a number of configurations.

DESCRIPTION OF THE PREFERRED EMBODIMENTS

Figure 1:
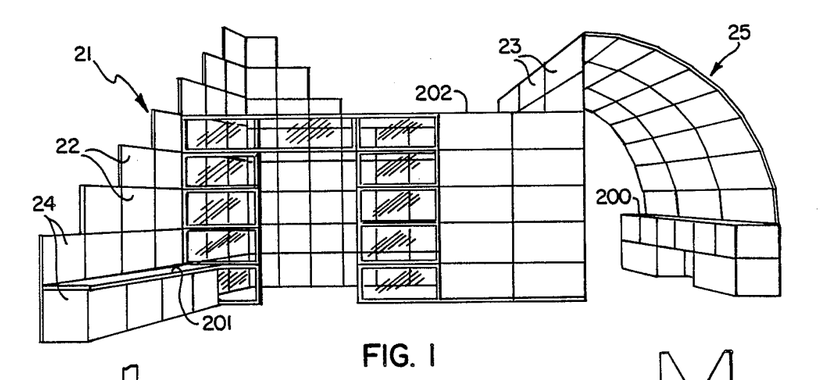
FIG. 1 is a perspective view of a typical enclosure, in this case a display booth, constructed with components of the present invention.

With reference now to the drawings, beginning particularly with FIG. 1 thereof, there is shown a complex structure 21 employing panel and connector elements of the present invention. Note that the panels can be joined not only in vertical stacked (22) and horizontally connected (23) arrangements, but can create T-shaped intersections of panels as at 24 as well as combinations of different vertical angles as at 25. In this Figure the exemplary structure is an exhibit booth, but is schematically representative of office interiors, especially when considered with FIG. 5.

Figure 3:
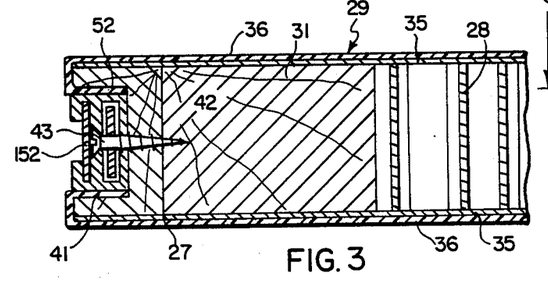
FIG. 3 is a sectional view taken on line 3—3 of FIG. 2.
Figure 23:
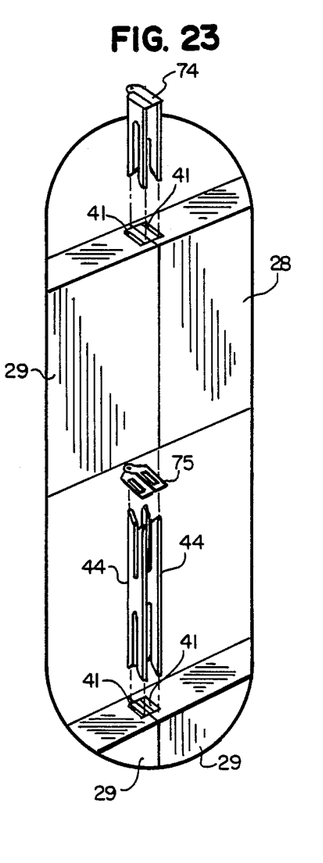
FIG. 23 is a perspective exploded view of four adjoining full bleed panels, showing hinged connector means and the end insertion alignments and appearance.

For the purposes of the description below and the claims, the following terms are defined: "Full bleed" refers to panels which are completely covered on their major external surfaces so that the internal structural framework of the panel is not visible to an observer when the panels are assembled into the desired exhibit booth, office enclosure or the like. To the eye of the observer, the full bleed system gives a visually complete impression with only single minimal lines where adjacent panels abut. (It is recognized that the edges of the panels on the periphery of the enclosure will be visible. Since this exposure is minimal, being limited to the edges of the peripheral panels and not showing on the faces of the panels, the definition of "full bleed" is not thereby affected. In any event, it is common for the panel covering of fabric, plastic, veneer or the like to be extended to such edges or to have the edges covered by a suitable edge inserts to complete the visual appearance, as shown in FIG. 3.) The "full bleed" effect is shown in detail in FIG. 23. It will be apparent that abutting panels have the appearance of a uniform, continuous surface, with only a minimal junction line visible. "Visible surfaces" are defined to be the two major surfaces of the panels which, when the panels are assembled, are visible to the observer. The edges of the panels are not considered to be "visible surfaces" by the definition used in this invention even though, as noted above, the peripheral penals will have visible edges. With these definitions in mind the following description will be readily understood by those skilled in the art.

Figure 2:
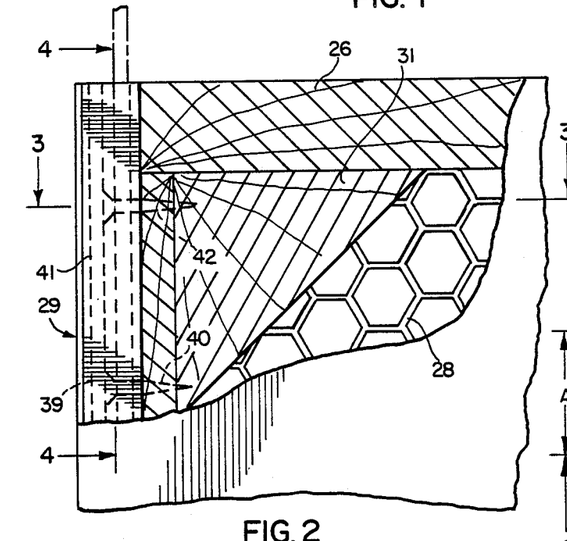
FIG. 2 is an enlarged view of one corner of a full bleed panel with the facing material cut away.
Figure 4:
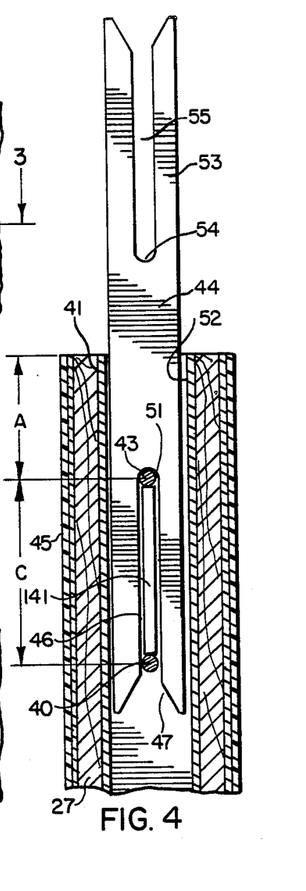
FIG. 4 is a sectional view taken on line 4—4 of FIG. 2 with a connector element inserted.

The typical panel structure is shown in FIGS. 2, 3 and 4. The frame of panel 29 is made of wood or other rigid material comprising elements 26 and 27 and has a lightweight honeycomb core 28 with appropriate corner stiffeners or fillet elements 31. The rigid elements 26 and 27 may each be comprised of a single piece or may be built up of separate elongated strips. An appropriate semi-stiff covering material 35 is coextensive with a major (i.e., visual) side of the panel 29; this may be a base layer of plastic, metal, wood or the like for an outer covering 36, or it may be a material intended to be visible on the panel itself, such as a decorative plastic or metal. Covering 36 may be a soft fabric in decorator colors, an attractive veneer or the like.

At least two opposite edges of the frame member of panel 29 are each formed with a groove for receiving channel member 41. The opposite paired edges may be member 26 and its opposite member, or member 27 and its opposite member, or both pairs. (For brevity the 27 pair can be considered as the "sides" in the typical FIG. 1 type configuration, and the 26 pair can be considered as the "top and bottom". Incorporating the channel member 41 in the "sides", so that it is disposed vertically, is preferred.) The channel member is formed of a rigid material, preferably extruded lightweight aluminum or equivalent. However, it is possible that the channel member could be made of a rigid plastic of suitable strength characteristics. Channel member 41 is anchored to frame member 27 by any appropriate means such as glue or nails. Preferably, however, there will be used one or more screws 39, 42 having respective shanks 40, 43. Screw 42 adjacent either end of channel member 41 on panel 29 is located a distance A (FIG. 4) or B (FIG. 21) from the end of the channel and consequently from the abutting edge of the panel. Screw 39 spaced further into the channel is located a distance C from screw 42.

Both the covering material 35 and the external covering 36 extend at least to all edges of the major sides of the panel 29. Preferably some of the material 35 or 36 extends around the edge of the panel, as shown in FIG. 3. It is also preferred that an insert 152 be fitted into channel 153 in channel member 41. The insert 152 is of a decorative material (which preferable will match material 36) to provide a finished appearance to the edge of panel 29.

The connector means and the manner in which such means fit into and join the panels are the critical features of this invention. No prior art system has utilzed such versatile and interchangeable elements which allow assembly of many stable full bleed structures, but which are so easy to use and which require no tools for such assembly. The connector means all incorporate an elongated bar component for insertion into the channel means 41. This bar operates, in many cases, in conjunction with a perforated flat coupler component. As will be seen, bar components and the coupler components can be combined in a wide variety of ways to produce connector means for many types of panel joints, and in all cases the connector means will have minimal visibility.

Figures 10, 11, 12, 13, 14, 15, 16, 17, 18, 19, 20, 21, 22:
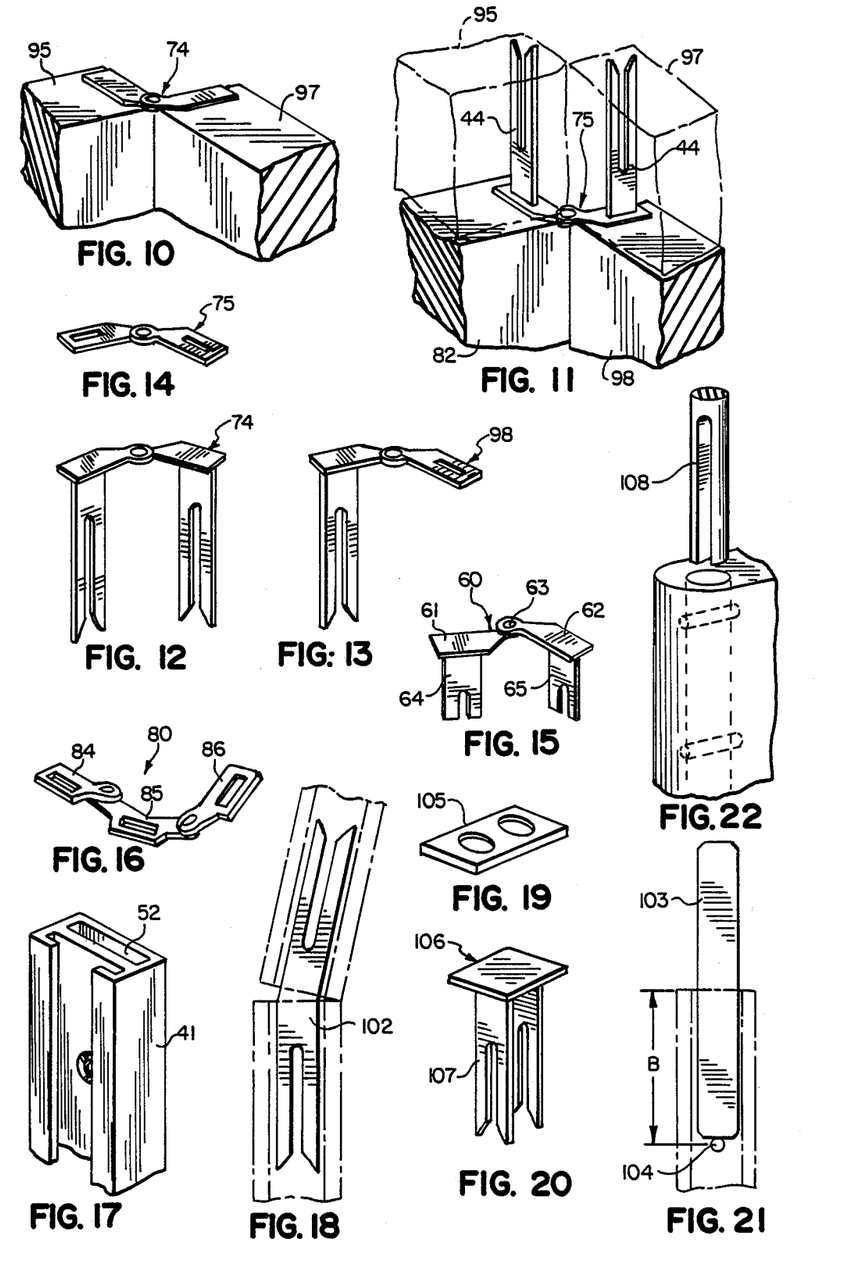
FIG. 10 is an enlarged view of joint 10 in FIG. 5.
FIG. 11 is an enlarged view of joint 11 in FIG. 5.
FIG. 12 is a perspective view of the connector element used in joint 10 as well as joints 113 and 114.
FIG. 13 is a perspective view of a connector element used in joint 112.
FIG. 14 is a perspective view of one component of a connector means used in joint 11 or in-line connection 19.
FIG. 15 is a perspective view of the connector means used in joint 6.
FIG. 16 is a perspective view of one component of the connector means used in joint 9.
FIG. 17 is an enlarged fragmentary perspective view of a portion of the channel element shown in FIG. 3.
FIG. 18 illustrates a connector element for joining two panels at a vertical angle.
FIG. 19 is a perspective view of an alternative component of a connector means similar to that of FIG. 14 for use with the connector element of FIG. 22.
FIG. 20 is a perspective view of a connector element for in-line connection 20.
FIG. 21 shows an alternative connector element similar to that of FIG. 4.
FIG. 22 depicts another alternative connector element similar to that of FIG. 4.

In its simplest form, the elongated post will be a rod with a round, square, elliptical or polygonal cross section, as the round rod 108 in FIG. 22, a flat "tongue depressor" bar 103 in FIG. 21, or the like. Most preferred, however, because of its ability to be seated snugly in the channel member 41, is a simple, flat bar with a blind slot at least one end thereof.

The most common component of this system is therefore the double ended bar 44 (or its variations 144 and 244). Bar 44 is shown with a straight body (i.e., uniform width) and will be used herein to exemplify the system. The externally tapered version 244 is preferred, however, because of its ease of insertion; it will be described in detail below. Tapered elements are also preferred for the various "combination" connector elements of the invention.

The simple double-ended flat bar 44 is shown in FIG. 4 for rigid edge-to-edge interconnection of two adjacent panels in planar configuration. End 45 of bar 44 is formed with a slot 46 having an enlarged internally tapered entryway 47 and a blind inner end 51. The slot 46 in connector bar 44 is dimensioned to closely engage the shanks 40, 43 of screws 39, 42. If desired a plastic guide 141 can be incorporated into channel 52 and positioned between screws 39 and 42 to provide positive friction engagement for slot 46 and enchance securing bar 44 in position. Connector bar 44 is inserted into channel 52 until end 51 of slot 46 engages shank 43 of screw 42. At this point the shanks of both screws are engaged by the confronting edges of slot 46 so that connector element 44 remains positively oriented as shown in FIG. 4. It is contemplated that connector 44 will slide securely over the two screw shafts (and, if present, guide 141) in such a manner as to assure alignment and rigidity of stacked components. The fit should be such that bar 44 is securely seated in channel 52 but not so great that the assembler or disassembler would need more than ordinary hand force to insert or withdraw the bar.

In this configuration screw 39 may be termed "guide means" while screw 42 may be termed "stop means"; as will be discussed below, the "stop means" may also be located at the end of the channel (so that the dimension equivalent to "A" in FIG. 4 is zero).

Another panel 29 having an identical channel structure as the panel portion shown in FIG. 4 can be stacked on top of the panel with the lower end of this channel member engaging the upper end 53 of bar 44 with equivalent screw shanks engaging blind end 54 of slot 55. A similar structure exists at the other end of the panel so that when two panels are placed together with abutting edges, their opposite edge channel members are joined by two identical connector elements 44. Note with respect to FIG. 5 that such connector elements 44 would be used to join the ends of two stacked panels at their common end point 58.

A critical feature of this invention is that the connector means all operate through the ends of channel members 41. As will be apparent by the discussion below, it is this "end only" coupling configuration adjacent the corners of the panels that allows the full bleed panels in this system to be abutted with virtually no visible appearance of the connector elements. It is also the "end only" configuration that allows the various panels to be connected quickly and securely and disconnected equally quickly. This differs markedly from earlier structures such as containers which have complex internal connections intended to connect along the parallel abutting sides of adjacent elements. Such systems cannot form full bleed structures, since they require external access holes which are visually objectionable; all of these are absent in the present full bleed system. In addition, the positive securement of the bars 44 and the related elements provides excellent structural stability, so that room-high office partitions or towering exhibit booths (as in FIG. 1) are routinely constructed.

The other basic element of the connector means is the flat coupler, of which examples are shown in FIGS. 14 and 19. The rigid coupler 105 in FIG. 19 is used only where there is no expectation that the panels will ever need to be pivotally hinged. Since the hinged coupler 75 of FIG. 14 can be used tightly closed as well as open, it is normally preferred for all connections.

Coupler 105 has round perforations, while coupler 75 has rectangular slot perforations. The perforations will of course be selected to match the cross sectional shape of the bar. Since the bar 44 is preferred, so also are slotted couplers as 75, 80 and 98. The slotted couplers can be chained, as at 75 and 80, or used singly in combination with one or more bar elements, as at 98 and 98'.

The interaction of bars 44 and couplers 75 is best illustrated in FIG. 11. Two bars 44 are inserted into channels 52 in the adjacent ends of panels 82 and 99 respectively. A coupler 75 is then slipped over the free ends of the bars and slid downward until seated against the top of the panels 82 and 99. Thereafter panels 95 and 97 are lowered onto the ends of the bars 44 so that the ends are secured in the channels 52 in these panels, making a secure, hinged corner as shown at joint 11 in FIG. 5.

As with the couplers, the bar elements can be configured in various combinations, as in FIGS. 12 and 15, at 74 and 60 respectively. A third bar could also be included, to form a triple-pronged unit 87 as used for joint 8 (see FIG. 8). Many other combinations not shown, such as two bars with a coupler between, two bars followed by a coupler, two couplers with a bar following, and so forth, can be formed. The particular orientation of the panel joint will dictate the coupler to be used, although in some cases more than one coupler/bar combination will work. Those skilled in the art will be able to readily determine the optimum configuration to use. A few representative examples herein of panel joints and hardware will illustrate the invention.

The alternative bar structures which are modifications of bar 44 are shown in FIGS. 20-21 and 24-26. Most preferred is bar 244 in FIG. 26. This bar has external tapers in the prong portions, over the length designated T. The broadest width W in the central portion assures the friction fit of the bar in channel 52. Tapering the prong portions down to lesser width W' at each end makes insertion of the bar 244 into channel 52 easier.

Figure 24:
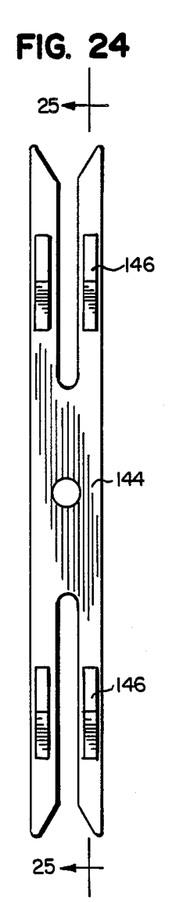
FIG. 24 is an elevation view of a connector element similar to that shown in FIG. 4 but having enhanced securing means incorporated therein.
Figure 25:
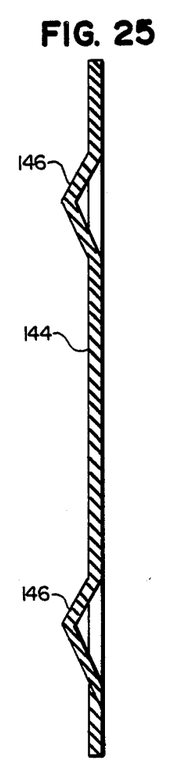
FIG. 25 is a sectional view of the connector element of FIG. 24 taken on line 25—25.
Figure 26:
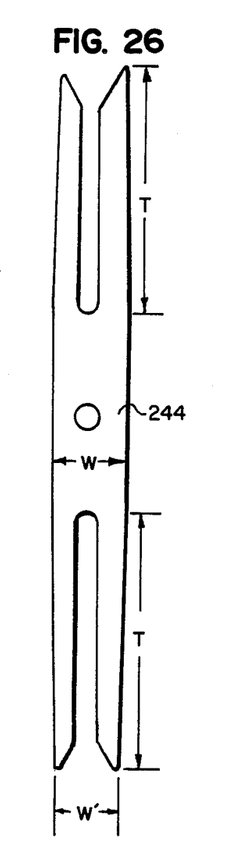
FIG. 26 is an elevation view of another alternative connector means similar to that of FIG. 4 but with a tapered body.

Alternatively, FIGS. 24 and 25 illustrate an embodiment (designated 144) of element 44 in which a plurality of protuberances 146 have been formed. These are intended to engage the sides of channel 52 and maintain a tight fit of element 144 in channel 52.

Yet another modification is the flat "tongue depressor" shaped bar 103 shown in FIG. 21. When using this bar 103, the stop means (abutting pins 104) are placed somewhat further from the open end of the channel but stability is maintained because the channel is configured to closely confine bar 103.

Another modification is shown in FIG. 22 where the connecting member 108 is not a flat bar but is a cylindrical rod. It could as well have a square, rectangular or any other cross section, but in any case it should preferably have a slot functioning together with the two screw shanks as in FIG. 4.

Figure 6:
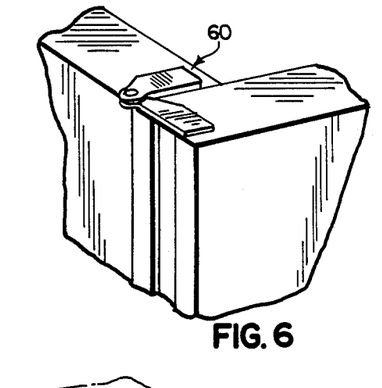
FIG. 6 is an enlarged view of joint 6 of FIG. 5.

In order to create joint 6 as shown in FIG. 6, the connector element 60 of FIG. 15 is employed. This connector comprises two flat elements 61, 62 interconnected by means of a hinge structure 63 allowing one element to pivot with respect to the other. Fixed to one side of each flat element 61, 62 are slotted bars 64, 65 respectively, each formed in the manner of bar 44 but having one half the length of that bar. Respective element pairs 61, 64 and 62, 65 may be interconnected by appropriate means such as welding. More preferably, however, the pairs 61, 64 and 62, 65 are each formed as a single piece as by forging or stamping. When it is desired to create a corner structure like that shown in FIG. 6, the connector element of FIG. 15 is inserted in two adjacent panels with bar members 64, 65 projecting into the ends of the respective channel members. Engagement with "stop means" in such a configuration can be in either of two fashions: with the preferred engagement with screws such as 42 recessed in the channel at a positive distance A, or by setting the predetermined distance A at zero the end of the channel effectively becomes the "stop means" and engages the connector bar at the top end thereof where the cross piece lies. This dual ability to cooperate with "stop means" at any predetermined distance from zero upward along the channel is inherent in a number of the coupling devices of this invention, including those shown in FIGS. 12, 15 and 20. Certain of the other devices, however, will function only with the screw "stop means" recessed in the channel (e.g., bar 44), so it is preferred to have such recessed "stop means" in all channels even though many of the devices will function with "stop means" at any point along the channel.

It will be understood that, as shown in FIG. 6, the flat elements 61, 62 lie on the surface at the top of the panels. From the point of view of the observer, however, the connector is seen only edge on and therefore the only visual appearance is the narrow line seen as the edge of the thin gauge metal of which the connector is formed. The same observation is true of the connector elements shown in FIGS. 7-11, and is particularly true of those elements shown in FIGS. 7, 9 and 11 for internal couplings, where only the end of the hinge portion is casually visible.

Figure 7:
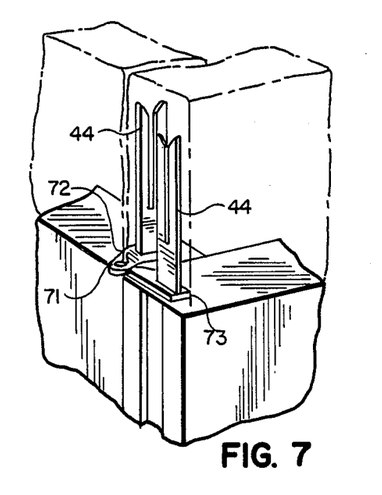
FIG. 7 is an enlarged view of joint 7 of FIG. 5.

To form the joint 7 as shown in FIG. 7, the connector device 71 is formed of hinged flat elements 72 and 73 substantially similar to the coupler of FIG. 14, but with one of the slot portions reversed in orientation. This is an example of where it is desired to have the interconnection of two panels with the channel edge of one panel abutting the broad side of the other panel adjacent the channel end along the rigid frame area, forming a smooth outer corner. Joint 7 is formed by inserting one end of each bar 44 in the adjacent panels and then slipping the slotted hinged coupler 71 over the projecting ends of slotted bars 44. A second pair of panels is then connected in the same manner above the panels shown in FIG. 7 to complete the outside corner shown in FIG. 5.

Another corner structure slightly different from that of FIGS. 6 and 7 is shown in FIG. 10 employing the connector device of FIG. 12. FIG. 12 shows a hinged element 74 much like that of FIG. 15 except that the bar orientation is reversed and it results in a corner appearing finished from the inside rather than the outside as seen in FIG. 6. Otherwise the element of FIG. 12 operates in a manner identical with that of FIG. 15.

Figure 8:
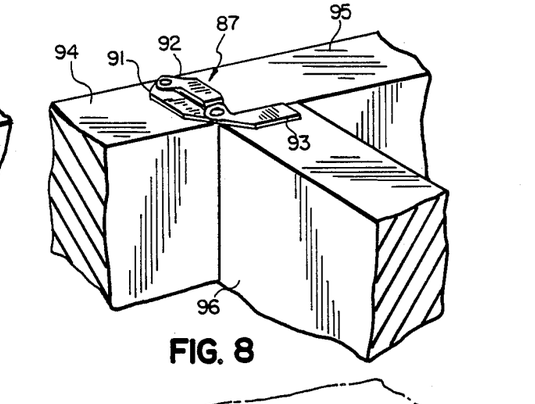
FIG. 8 is an enlarged view of joint 8 of FIG. 5.
Figure 9:
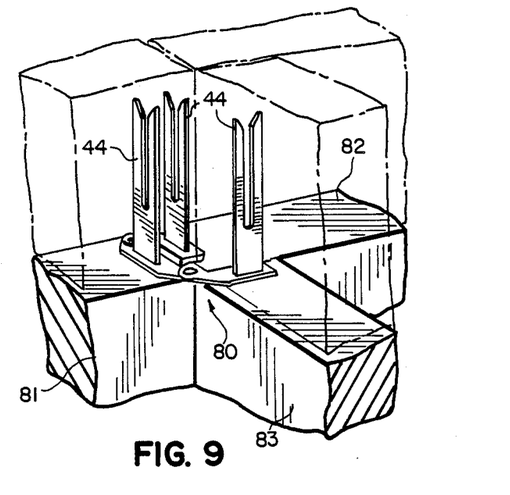
FIG. 9 is an enlarged view of joint 9 of FIG. 5.
Figure 29:
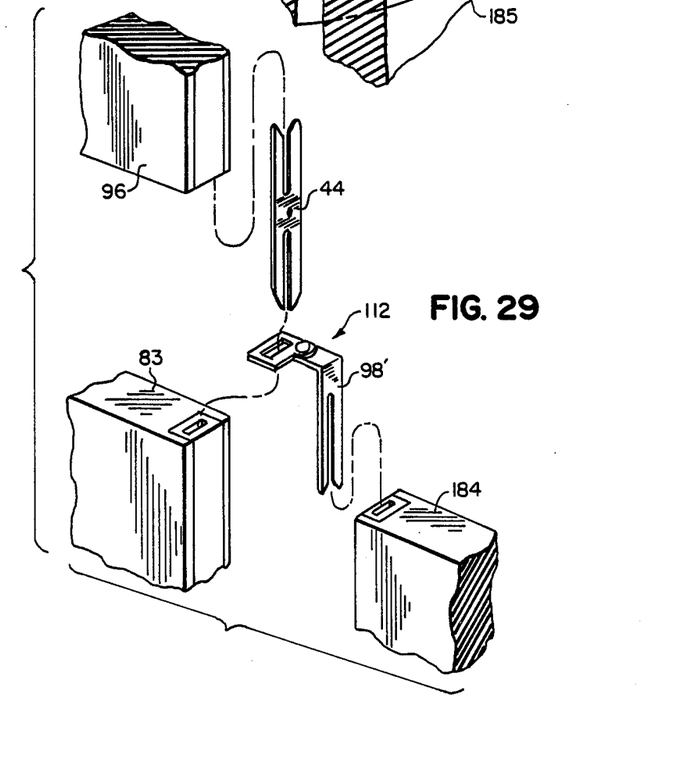
FIG. 29 is an exploded, simplified perspective view of joint 112.

Single and double T-shaped junctions are depicted in FIGS. 8 and 9. Joint 9 employs the triple-hinged element 80 of FIG. 16 together with a with three double-slotted bars 44 to connect two panel members 81, 82 in end-to-end abutment and further in side-to-end abutment with panel 83. Hinged element 80 is formed of three hinged flat slotted members 84, 85 and 86. Panels 94, 95 and 96 are thereafter mounted on the free ends of the bars 44 in a manner analogous to that described above in the discussion of FIG. 11. Similarly, the joint of FIG. 8 is formed of a connector 87 having three flat elements 91, 92 and 93, each having extending downwardly therefrom a half length slotted bar projecting into the channels at the adjacent edges of panels 94, 95 and 96. To make a stepped corner junction 112 meeting at 57 by placing a panel 184 at the end of panel 83 in FIG. 5, connecting element 98' (the reverse of connector 98 of FIG. 13) would be used as illustrated in FIG. 29. This provides a finished structure for the top left hand corner of panel 184 and, in conjunction with a double-slotted bar 44, means for connecting panel 96 vertically on top of panel 83.

Figure 5:
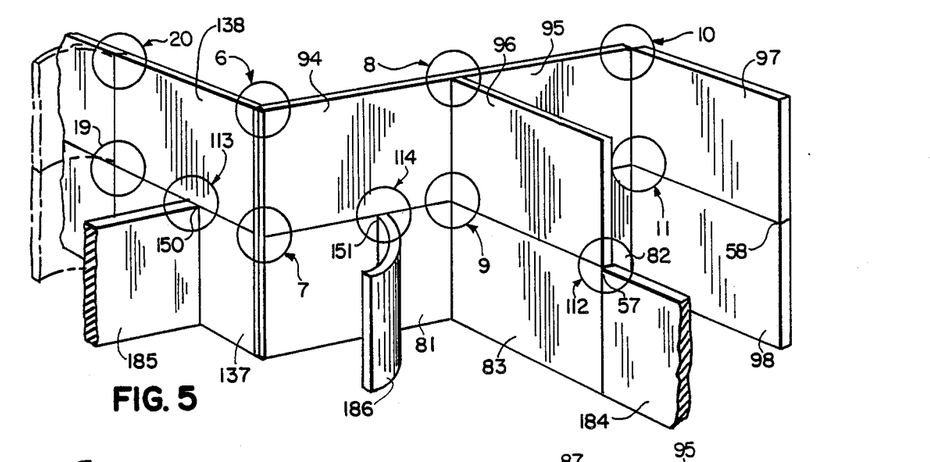
FIG. 5 is a perspective view of an assembly of panels with a variety of types of joints.
Figure 28:
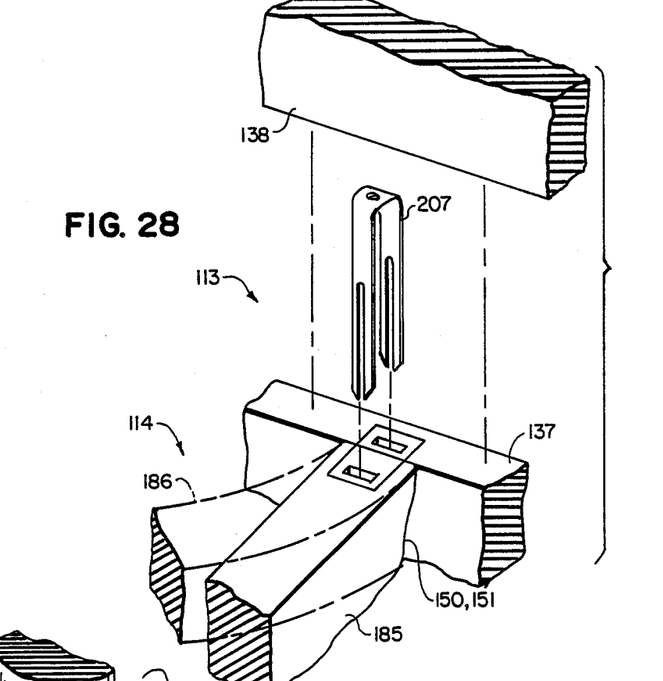
FIG. 28 is an exploded, simplified perspective view of joint 113 (or, in phantom, joint 114)

FIG. 20 shows the rigid connector element 106, with prongs 107, which is used in joint 20, when no hinging capability is desired. Note that in-line joints 19 and 20 may join two straight panels as shown in FIG. 5, straight and curved panels (shown in phantom) or two curved panels (note shown.) An alternative form of this type of connector is shown in FIG. 28. This alternative device 207 may be easily formed singly by bending a double-ended bar 44 to the shape shown.

In another alternative, one can incorporate a channel member 41 into a visible surface of a panel, and then attach a second panel at right angles thereto, as shown in FIG. 5 with panels 185 and 186 meeting panels 137 and 81 at 150 and 151, respectively, and in a simplified schematic form in FIG. 28. The projecting panel may be straight (as 185) or curved (as 186). If it is to be hinged a connector as in FIG. 12 will be used; otherwise one as in FIG. 20 will be used. Panel 138 may be placed on top of panel 137 and/or an additional panel (not shown) may be placed on top of panel 185 or 186. In this case connector means such as that shown in FIG. 29 would be used.

Figure 27:
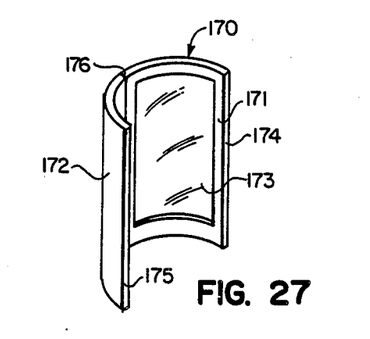
FIG. 27 is a perspective view of two curved panels, one containing a glass window.

If it is desired to form arched or curved structures as shown at 25 in FIG. 1, angled bar elements such as 102 in FIG. 18 may be used. Alternatively, the panels themselves may be curved, as 186. The curved structures may be of any size and may be oriented vertically or horizontally. One useful structure is shown in FIG. 27, a small two piece structure 170 which may be used as a display case. It consists of quarter-round or quarter-square (90°) panels 171 and 172. Panel 171 is shown as incorporating glass window 173 so that the contents of the case can be viewed. Obviously panel 172 could also have such a window. Panel edges 174, 175 and 176 are constructed the same way as the other panel edges described above, and are joined by the same types of connecting means (although not shown in detail in this simplified Figure).

It will be recognized that elements such as hinged member 80 of FIG. 16 can be turned over to provide a joint such as that shown in FIG. 9 but with panel 83 abutting the surface of panel 81 instead of panel 82. Similarly, various combinations of hinged and fixed horizontal elements together with full and attached half length flat elongated bar elements may be created to satisfy different requirements for different structures. Other reversals of the various connector elements provide complete versatility to enable one to construct a booth or similar structure with all of the complexity of that shown in FIG. 1 or even structures of greater extent and complexity.

Figure 30:
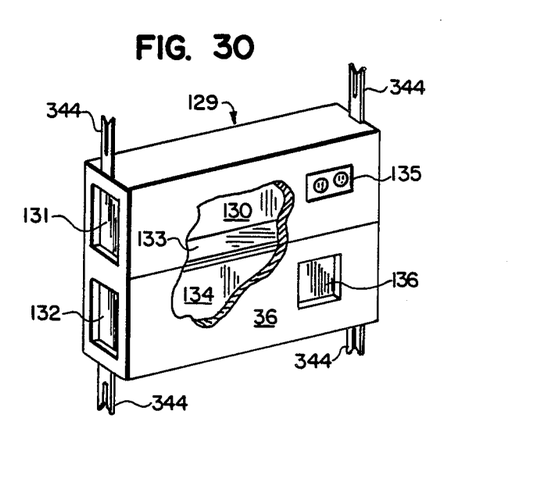
FIG. 30 is a perspective view, simplified and partially cut away, showing an electrical service panel of this invention.

An opaque, light weight, honeycomb structure is shown for the panels of this invention. The area inside the rigid frame could also be transparent, completely open or have partial sliding panels to provide openings as desired. Provision may also be made to pass electrical conduits through channel openings adjacent to opening 52. This can readily be accomplished by using an aluminum extrusion form of channel 41 which has a second channel inwardly of opening 52. It is also possible to substitute a special electrical conduit panel for a standard decorative panel in the present system. Dimensionally the electrical panel (designated 129 in FIG. 30) is the same as other panels, and it contains connector elements 344 for interconnection with the other panels, by insertion into those adjacent panels' channels 52 in a manner analogous to use of bar 44. The interior of panel 129 is hollow, and access is gained through an edge opening such as 131 or 132. In the example shown in FIG. 30, the panel is divided into upper and lower chambers by divider 133 to allow two different electrical systems to use the panel without interference. For instance, the upper chamber 130 could be used for power lines, with conventional socket 135, while the lower chamber 134 could be used for computer cables, which would be led out to an adjacent terminal through opening 136. The visible surface would have a covering 36 matching adjacent panels. If desired, the visible surface could be in a lift-off or hinged form to provide additional access to the panel interior. Such features enhance the value of the system for modular office enclosures and the like.

All of the panels can be relatively small and of the same size. However, if the panels have modular dimensions, such as being whole integer multiples of predetermined height, width and depth, significant modularity is available. From a utility standpoint, it has been found that 9½ inches (24 cm) is an optimum modular height unit. The integral multiples of that dimension, when applied to height from the floor, provide structures which have counters, desk tops and so forth placed at ideal work heights, as at 200 and 201 in FIG. 1, and also will correspond closely to standard "room height" (202 in FIG. 1) and many maximum display height requirements.

It will be evident that there are numerous embodiments not specifically described herein which are clearly within the scope and spirit of this invention. The above description is therefore to be considered exemplary only, and the invention is to be limited solely by the appended claims.

What is claimed is:

1. A modular full bleed panel and connective hardware system for which a variety of structures with shapes characteristic of wall segments, booths and the like may be rapidly assembled, said system comprising:
    (a) a plurality of full bleed panels of modular dimensions which may be connected vertically and horizontally, each panel comprising:
        (i) a substantially rigid internal frame fully covered on its visible surfaces, said frame having two opposite vertical edges extending from top to bottom of the panel;
        (ii) channel means fully recessed in each of said two opposite vertical edges of said frame for use in interconnecting the panels, each channel means being formed with openings at either end thereof, said openings being at the top and bottom of said panel respectively, and positioned to enable longitudinal alignment of corresponding channel means of two panels aligned vertically and substantially parallel alignment of corresponding channel means of two panels aligned horizontally; and
        (iii) stop means as part of each channel means, said stop means being spaced a predetermined distance from said openings at either end of said channel means; and
    (b) a plurality of modular connector means each of which is adapted for insertion into adjacent ends of said channel means of at least two adjacent panels aligned vertically or horizontally; each connector means comprising at least two elongated, substantially rigid vertical post members and a horizontal plate member cooperating therewith, each said post member having an end adapted to extend into an open end of one of said adjacent channel means, the distance each post can extend into said end of said channel means being defined by said stop means; the other end of each said post member cooperating with said plate member, said post members extending respectively into said adjacent channels of said adjacent panels to provide positive, substantially rigid or hinged vertical or horizontal alignment of said two adjacent panels by connection only through the ends of the channels.

2. A modular system as in claim 1 wherein said stop means is in each channel means.

3. A modular system as in claim 2 wherein said horizontal plate is adapted to receive at least two posts in parallel relationship thereby to interconnect at least two panels with respective channel means.

4. A modular system as in claim 3 wherein said horizontal plate member is formed with two holes each adapted to receive one of said post member therein.

5. A modular system as in claim 4 wherein said horizontal plate member is formed of two hinged portions, each portion formed with one of said holes.

6. A modular system as in claim 3 wherein said horizontal plate member is formed with three holes each adapted to receive one of said posts therein.

7. A modular system as in claim 6 wherein said horizontal plate member is formed of three sequentially hinged portions, each portion formed with one of said holes.

8. A modular system as in claim 2 wherein said elongated, substantially rigid post comprises a flat bar having longitudinal blind slots opening into either end thereof, said blind ends of said slots abutting said stop means.

9. A modular system as in claim 8 wherein said bar has a substantially rectangular cross section.

10. A modular system as in claim 9 wherein said bar has a maximum uniform width in its central portion and tapers to a lesser width at its extremeties.

11. A modular system as in claim 9 wherein said bar is formed with at least one protuberance which engages the inside surface of said channel to cause said bar to fit securely in said channel.

12. A modular system as in claim 8 wherein said stop means comprises:
    a stop member; and
    a guide member spaced down said channel from said stop member, said slot in said bar closely engaging both said stop member and said guide member thereby to maintain said bar oriented parallel to the longitudinal dimension of said channel.

13. A modular system as in claim 8 wherein said horizontal plate member is adapted to receive at least two said bars in parallel relationship thereby to interconnect at least two panels with respective channel means.

14. A modular system as in claim 13 wherein said horizontal plate member is formed with two holes each adapted to receive one of said bars therein.

15. A modular system as in claim 14 wherein said horizontal plate member is formed of two hinged portions, each portion formed with one of said holes.

16. A modular system as in claim 13 wherein said horizontal plate member is formed with three holes each adapted to receive one of said bars therein.

17. A modular system as in claim 16 wherein said horizontal plate member is is formed of three sequentially hinged portions, each portion formed with one of said holes.

18. A modular system as in claim 2 wherein said connector means further comprises at least one connector member being formed with at least two of said parallel, elongated, substantially rigid post member connected at one end thereof to said horizontal plate and adapted to fit within said channel menas to interconnect said panels with said channel means on two adjacent panels.

19. A modular system as in claim 18 wherein said post member on said connector member are hinged with respect to each other but maintain a parallel relationship.

20. A modular system as in claim 18 wherein said connector member is substantially rigid and said post member maintain a fixed parallel relationship.

21. A modular system as in claim 18 wherein said connector member comprises three portions adapted to interconnect at least three said panels with their respective channel means.

22. A modular system as in claim 21 wherein said three portions of said connector member are sequentially hinged.

23. A modular system as in claim 18 wherein said posts comprise flat rectangular bars having longitudinal blind slots opening into either end thereof.

24. A modular system as in claim 23 wherein each said bar has a maximum uniform width extending over a portion of its length adjacent the blind end of said slot and tapers to a lesser width at the open end of said slot.

25. A modular system as in claim 2 wherein said horizontal plate further comprises at least one horizontal plate formed with at least one opening adapted to receive one first said post member, and at least one second said elongated, substantially rigid post member connected at one end to said horizontal plate and extending therefrom and adapted to fit within said channel means on one said panel, said first post member being adapted to extend through said opening and fit within said channel means on two adjacent said panels.

26. A modular system as in claim 25 wherein the portion of said connector to which said second post member is mounted is hinged with respect to that portion formed with said opening.

27. A modular system as in claim 26 wherein each said post member comprises a flat rectangular bar.

28. A modular system as in claim 27 wherein each said bar has a maximum uniform width extending over a portion of its length adjacent the blind end of said slot and tapers to a lesser width at the open end of said slot.

29. A modular system as in claim 2 wherein said post member has one end thereof arranged at an angle with respect to the other end, either end of said post member being adapted to fit within said channel means on two adjacent said panels to maintain said panels at such longitudinal angle, said post member abutting said stop means in said channel means.

30. A modular system as in claim 1 wherein said stop means is at the end of said channel.

31. A modular system as in claim 30 wherein said connector means further comprises at least one connector member being formed with at least two of said parallel, elongated, substantially rigid post member connected at one end thereof to said horizontal plate and adapted to fit within said channel menas to interconnect said panels with said channel means on two adjacent panels.

32. A modular system as in claim 31 wherein said post member on said connector member are hinged with respect to each other but maintain a parallel relationship.

33. A modular system as in claim 31 wherein said third connector member is substantially rigid and said post member maintain a fixed parallel relationship.

34. A modular system as in claim 31 wherein said connector member comprises three portions adapted to interconnect at least three said panels with their respective channel means.

35. A modular system as in claim 34 wherein said three portions of said connector member are sequentially hinged.

36. A modular system as in claim 31 wherein said posts comprise flat rectangular bars or cylindrical rods.

37. A modular system as in claim 36 wherein said post comprises a bar having a maximum uniform width extending over a portion of its length adjacent the blind end of said slot and tapering to a lesser width at the open end of said slot.

38. A modular system as in claim 30 wherein said connector means further comprises said horizontal plate member formed with at least one opening adapted to receive one first said post member and at least one second said elongated, substantially rigid post member connected at one end thereof to said horizontal plate member and adapted to fit within said channel means on one said panel, said first post member being adapted to extend through said opening and fit within said channel means on two adjacent said panels.

39. A modular system as in claim 38 wherein the portion of said plate to which said second post member is mounted is hinged with respect to that portion formed with said opening.

40. A modular system as in claim 39 wherein each said post member comprises a flat rectangular bar or cylindrical rod.

41. A modular system as in claim 40 wherein said post member comprises a bar having a maximum uniform width extending over a portion of its length adjacent the blind end of said slot and tapering to a lesser width at the open end of said slot.

42. A modular system as in claim 1 wherein said panel includes means to pass electrical conduit therethrough.

43. A modular system as in claim 42 wherein said panel is divided into upper and lower chambers to allow two different electrical systems to use the panel without interference.

44. A modular system as in claim 42 wherein said panel has at least one hinged or removable surface to provide access to the panel interior.

* * * * *